(12) United States Patent
Criddle et al.

(10) Patent No.: US 6,507,906 B1
(45) Date of Patent: Jan. 14, 2003

(54) METHOD AND SYSTEM FOR SELECTION OF A BOOT MODE USING UNATTENDED BOOT SEQUENCING

(75) Inventors: Ronald K. Criddle, Austin, TX (US); Kerry Alan Lucas, Round Rock, TX (US); Jayeshkumar M. Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,834

(22) Filed: Sep. 9, 1999

(51) Int. Cl.$^7$ .......................... G06E 15/177; G06E 3/00; H02M 3/05
(52) U.S. Cl. ................. 713/2; 710/10; 714/36
(58) Field of Search ............... 713/2; 710/10; 714/36

(56) References Cited

U.S. PATENT DOCUMENTS 6,178,503 B1 * 1/2001 Madden et al. ............... 713/2

OTHER PUBLICATIONS

J. Kearney wrote the article under Newsgroups: comp.os.ms/windows.win95.misc; title: Start win–95 in ms–dos mod; date: Aug. 5, 1998.*

Kestutis Sipavicius wrote the article under newsgroups: microsoft.public.win95.setup; title: msdos.sys; date: Mar. 17, 1998.*

Tobias Regenbrecht wrote the article under newsgroups: comp.os.ms–windows.win95.misc; title: Can you make Win 95 boot at Dos–prompt as defaultot?; date: Dec. 3, 1995.*

* cited by examiner

Primary Examiner—Thomas Lee
Assistant Examiner—Suresh K Suryawanshi
(74) Attorney, Agent, or Firm—Duke W. Yee; Mark E. McBurney; Lisa L. B. Yociss

(57) ABSTRACT

A method and system for unattended boot sequencing is provided. A data processing system is powered on, and a boot mode menu is retrieved and displayed for a user. The user selects a boot mode from the boot mode menu, and the selected boot mode is stored in non-volatile memory. The system boot process is then initiated. At a subsequent point in time, the system boot process is able to execute the boot mode selected by the user. The selected boot mode is retrieved, and the selected boot mode process is then executed. The initial display and selection of a boot mode may be performed by a service processor or service firmware in a multiprocessor system.

14 Claims, 3 Drawing Sheets

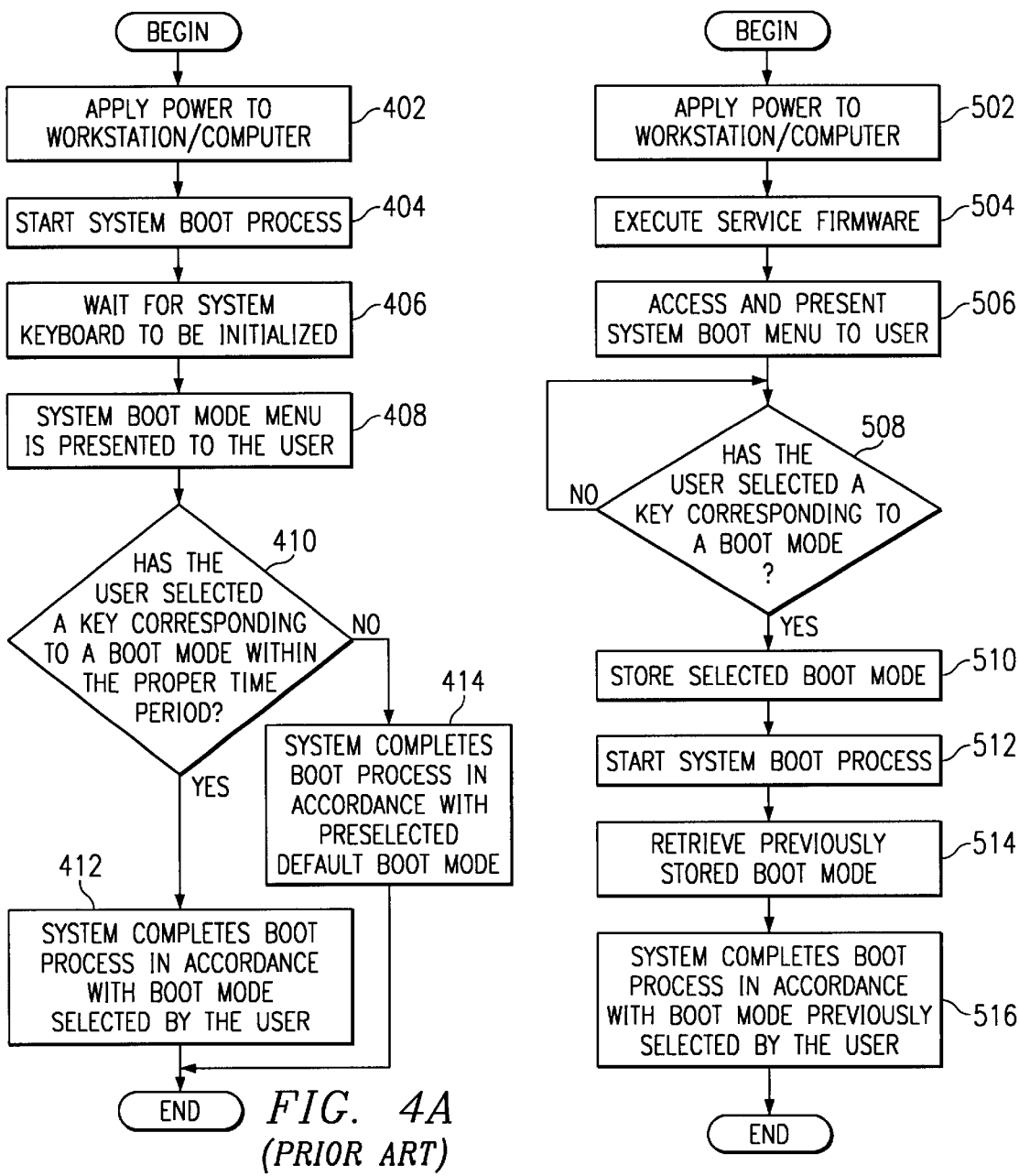

METHOD AND SYSTEM FOR SELECTION OF A BOOT MODE USING UNATTENDED BOOT SEQUENCING

BACKGROUND OF THE INVENTION

1. Technical Field

The present invention relates to an improved data processing system and, in particular, to a method and system for data processing system initialization, specifically, booting or initial program load (IPL) of a data processing system.

2. Description of Related Art

When a computer is started or reset, either by turning the power on or pressing a reset button, the computer executes a series of steps in a process termed "booting" the computer in order to prepare the computer for operations under an operating system. During the boot process, a BIOS (Basic Input/Output System) ROM in the computer may automatically perform basic hardware tests and then pass control to a larger boot loader program which loads an operating system. The computer may then be configured to boot to a desktop presentation manager in which the user may begin running applications. The boot operations are usually automatic, and a user does other things while the computer is booting.

As computers have become more sophisticated with network connections, complex components, etc., the boot process has become more complicated and takes more time to complete. During this time, a user generally ignores the computer. For example, an office worker may try to efficiently occupy time by performing paperwork around the office, or if the office worker is powering on the computer at the start of a working day, the office worker may wander away from the computer to speak to coworkers.

Some boot processes are designed to allow a user to interrupt the boot process or to select particular boot modes. Typically, the user must press a particular key or combination of keys during a particular time period indicated on the computer display to send a signal to the boot process of the user's desire to interrupt the boot process or to select a particular boot mode. However, if the user wanders away from the computer, the user will miss the interruption or selection time period. In order to interrupt the boot process or to select a boot mode, the user must observe the computer display and respond at the appropriate time. If the interruption or selection time period lasts only thirty seconds at a time point up to a half-hour into the entire boot process, a user may waste a significant amount of time waiting to interrupt the boot process or to select a boot mode. Even if the user is not present during the entire boot process, the user is required to return to the computer at approximately the correct time and then wait for the interruption or selection time period.

Therefore, it would be advantageous to provide a method and system for efficiently booting a computer, and in particular, to provide unattended boot sequencing.

SUMMARY OF THE INVENTION

A method and system for unattended boot sequencing is provided. A data processing system is powered on, and a boot mode menu is retrieved and displayed for a user. The user selects a boot mode from the boot mode menu, and the selected boot mode is stored in non-volatile memory. The system boot process is then initiated. At a subsequent point in time, the system boot process is able to execute the boot mode selected by the user. The selected boot mode is retrieved, and the selected boot mode process is then executed. The initial display and selection of a boot mode may be performed by a service processor or service firmware in a multiprocessor system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction wit accompanying drawings, wherein:

FIG. 3 is an example of a display menu with selectable boot modes;

FIG. 4A is a flowchart depicting a prior art process for booting a computer including user boot mode selection;

FIG. 5A is a flowchart depicting a process for booting a computer including user boot mode selection in accordance with a preferred embodiment of the present invention.

DETAILED DESCRIPTION OF THE PREFERRED EMBODIMENT

Figure 1:
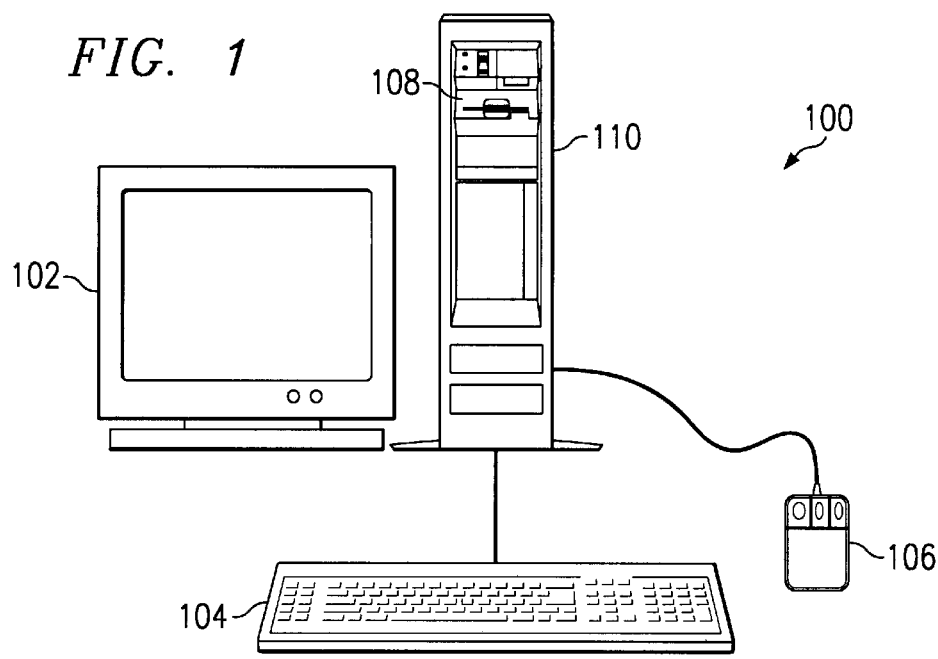
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system. Although the depicted representation shows a server-type computer, other embodiments of the present invention may be implemented in other types of data processing systems, such as workstations, network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

Figure 2:
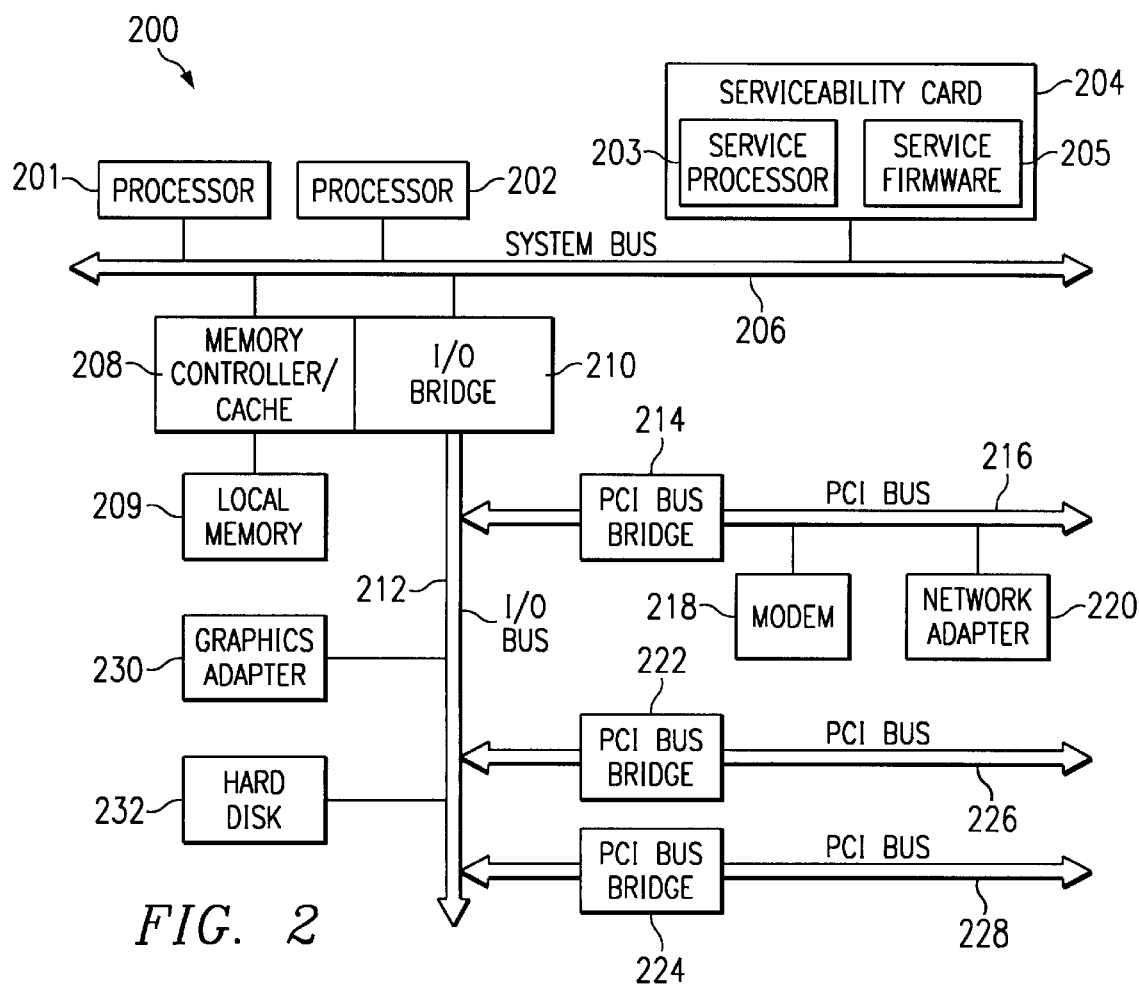
FIG. 2 is a block diagram illustrating internal components of a data processing system that may implement the present invention.

With reference now to FIG. 2, a block diagram depicts internal components of a server-type data processing system which may implement the present invention. Data processing system 200 may be a symmetric multiprocessor (SMP) system including a plurality of processors 201–203 connected to system bus 206. Processors 201–203 may be any suitable processor, such as a processor selected from the PowerPC family of processors. Processor 203 is a service processor placed on serviceability card 204 along with service firmware 205, which controls the initial BIOS and also provides the ability of a system operator or service personnel to perform system diagnostics or servicing through its interface. Memory controller/cache 208, which provides an interface to local memory 209, is also connected to system bus 206. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors.

Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk rive and the like also may be used in addition or in place of the hardware depicted. The depicted example is not meant to imply architectural limitations with respect to the present invention.

The most basic, starting function of a computer is the power-on followed by the initiation of a boot process. Many workstations have more than one boot mode that is selectable by the user. However, the user must attend the computer in order to interrupt the boot process or select the boot mode at the proper time. The present invention provides a method and system for unattended boot sequencing during the booting process of a computer.

With reference now to FIG. 3, an example of a display menu with selectable boot modes is shown. Menu 300 contains selectable menu items 301–304 that may be selected by a user through the arrow and enter keys on a system keyboard or through the selection of a number key corresponding to one of the numbers associated with the menu items. Other alternative selection mechanisms may also be provided, and the presentation quality of the user interface depends on the availability and capability of the computer system to interact with the user during the boot process.

With reference now to FIG. 4A, a flowchart depicts a prior art process for booting a computer including user boot mode selection. The process begins with the application of power to the computer (step 402) and the commencement of the system boot process (step 404). At some point during the boot process, the system keyboard is initialized (step 406), and the boot mode selection menu is subsequently presented to the user (step 408). A determination is then made as to whether the user has selected, within the allotted time period, a key on the keyboard that corresponds to a predetermined selectable boot mode (step 410). If so, then the system continues the boot process in the boot mode selected by the user (step 412). If the user has not selected a boot mode within the allotted time period, then the system continues the boot process according to a preselected default boot mode (step 414). In either case, the process then completes.

Figure 4B:
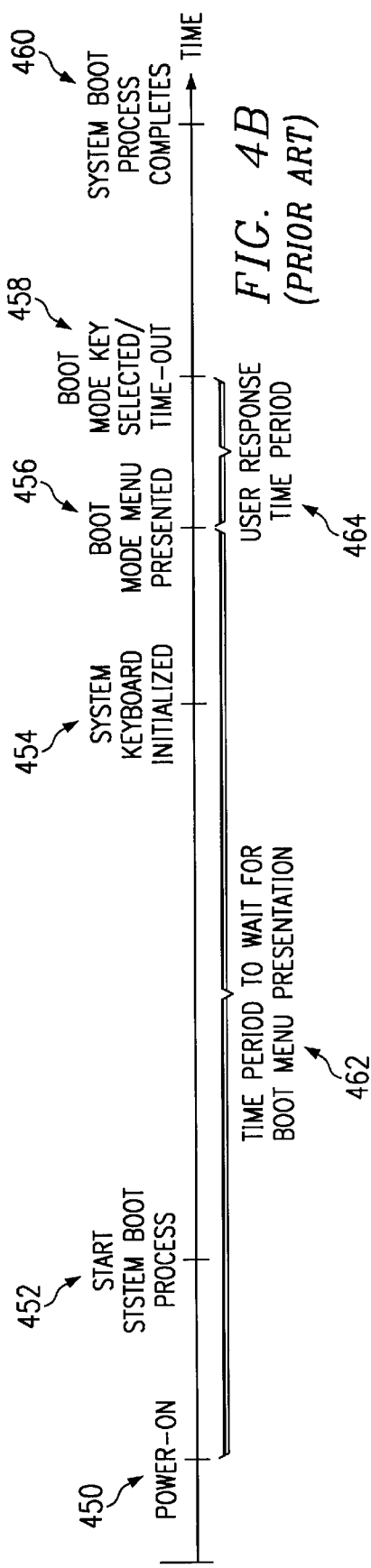
FIG.4B is a timeline depicting significant timepoints during a prior art process for booting a computer including user boot mode selection.

With reference now to FIG. 4B, a timeline depicts significant timepoints during a prior art process for booting a computer including user boot mode selection. The timepoints on the timeline generally correspond to the steps shown in the process depicted in FIG. 4A. The computer is powered on at timepoint 450, and the system boot process is started at timepoint 452. The system keyboard is initialized at timepoint 454, and the boot mode menu is presented at timepoint 456. The user must select a key associated with a boot mode before the selection period time-out at timepoint 458, and the system boot process completes at timepoint 460. Time period 462, during which the user must wait for the boot menu to appear, can be quite long compared to time period 464 during which the user is allowed to select a particular boot mode.

With reference now to FIG. 5A, a flowchart depicts a process for booting a computer including user boot mode selection in accordance with a preferred embodiment of the present invention. The process begins with the application of power to the computer (step 502). Service firmware is executed (step 504), and a system boot menu is accessed and presented to the user (step 506).

A determination is then made as to whether the user has selected a boot mode (step 508). The process may wait for a user to select a boot mode from the menu. Alternatively, the process may have a configurable time-out period in which the user should respond with a boot mode selection. If the user has not selected a boot mode, then the system loops as it waits for the boot mode selection.

If the user has selected a boot mode, then the boot mode selected by the user is stored for subsequent retrieval (step 510). The system boot process is then commenced (step 512), and at the point in time at which the system is initialized such that the system may execute any of the possible boot modes, the system then retrieves the previously stored boot mode (step 514) and continues the boot process according to the boot mode previously selected by the user (step 516). The process then completes.

Referring again to FIG. 2, in a preferred embodiment of the present invention, service firmware 205 gains control of the computer prior to a normal BIOS initialization. Service firmware 205 may perform functions that are generally performed by a BIOS ROM in some computer systems. At that point in time, the service firmware performs the minimum required setup for communicating with the display and keyboard. The service firmware has access to non-volatile memory in which the boot mode menu is stored. The service firmware also has access to memory in which to store the boot mode selected by the user such that the system boot process can not initialize the memory and overwrite the selected boot mode. In a preferred embodiment, the selected boot mode is stored in memory in a partition accessible only to system firmware 205. Service firmware 205 uses service processor 203 to write the character data of the boot mode menu to the system display and to read any keys selected by the user.

Alternatively, a single processor system may similarly use a firmware module to read character data for a boot mode menu stored with the firmware and to store a boot mode selected by the user until needed.

Figure 5B:
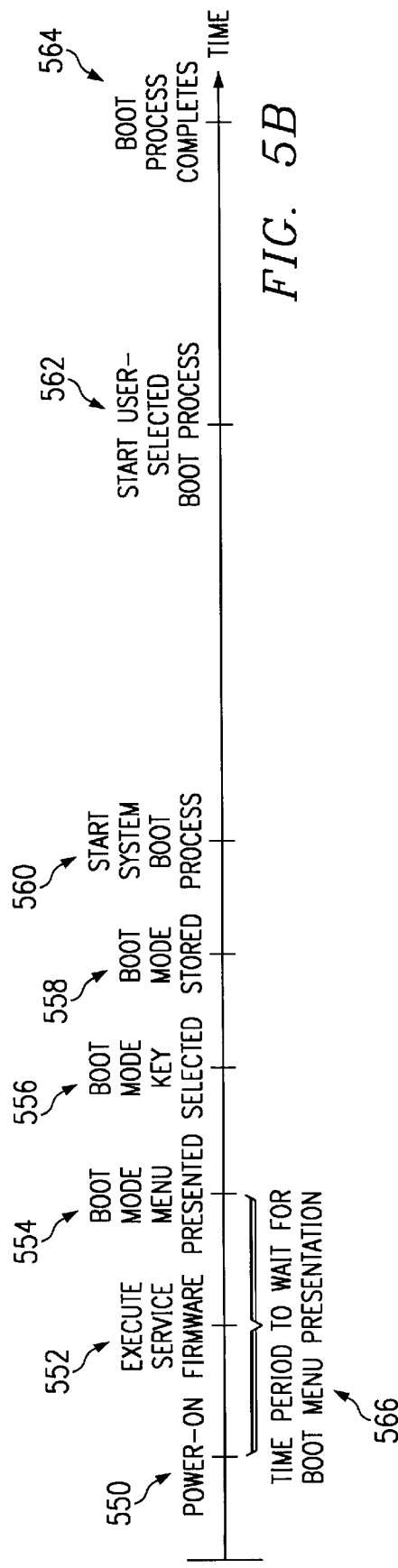
FIG. 5B is a timeline depicting significant timepoints during a process for booting a computer including user boot mode selection in accordance with a preferred embodiment of the present invention.

With reference now to FIG. 5B, a timeline depicts significant timepoints during a process for booting a computer including user boot mode selection in accordance with a preferred embodiment of the present invention. The timepoints on the timeline generally correspond to the steps shown in the process depicted in FIG. 5A. The computer is powered on at timepoint 550, and service firmware is executed at timepoint 552. The boot mode menu is presented to the user at timepoint 554. The user selects a key associated with a boot mode at timepoint 556, and the boot mode is stored at timepoint 558. The system boot process is then started at timepoint 560. After some period of time, the boot mode selected by the user is retrieved at timepoint 562 and used to continue the boot process, which completes at timepoint 564. Time period 566 during which the user must wait for the boot menu to appear is relatively short. If the process waits for the user to enter a selected boot mode, then the user may take as long as is necessary to enter a selected boot mode.

The advantages provided by the present invention should be apparent in view of the detailed description of Docket No. AT9-99-493 provides a method and system for unattended boot sequencing during the booting process of a computer. After a minimum of initialization is completed, the boot mode menu is presented to the user as soon as possible. By storing the user-selected boot mode in a manner such that it may be subsequently retrieved, the user is freed from waiting for the time period during which the boot mode may be selected. If the computer is being restarted or rebooted by a computer technician in order to perform diagnostics on the computer, the service mode may be selected early in the boot sequence so that the technician may make efficient use of time by performing other tasks while waiting for the computer to boot. In this manner, user interaction in the boot process is completed early in the boot process.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include ROM chips or writable-type media such a floppy disc, a hard disk drive, a RAM, and CD-ROMs as well as transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for initializing a data processing system the method comprising the computer-implemented steps of:

selecting a boot mode;

storing the selected boot mode;

starting a system boot process;

retrieving the selected boot mode;

executing the boot mode process associated with the selected boot mode; and wherein the selected boot mode is stored and retrieved using a service processor in a multiprocessor data processing system.

2. The method of claim 1 further comprising:

retrieving a boot mode menu; and displaying the boot mode menu.

3. The method of claim 1 wherein the boot mode menu is stored in non-volatile memory.

4. The method of claim 1 wherein the selected boot mode is stored and retrieved using a firmware module in the data processing system.

5. The method of claim 4 wherein the selected boot mode is stored in non-volatile memory accessible only by the firmware module.

6. The method of claim 4 wherein the firmware module performs BIOS functions.

7. The method of claim 1 wherein the selected boot mode is stored in non-volatile memory.

8. A data processing system comprising:

selecting means for selecting a boot mode;

storing means for storing the selected boot mode;

starting means for starting a system boot process;

first retrieving means for retrieving the selected boot mode;

executing means for executing the boot mode process associated with the selected boot mode; and wherein the data processing system is a multiprocessor data processing system comprising a service processor, and wherein the selected boot mode is stored and retrieved using the service processor.

9. The data processing system of claim 8 further comprising:

second retrieving means for retrieving a boot mode menu; and displaying means for displaying the boot mode menu.

10. The data processing system of claim 8 further comprising a non-volatile memory in which the selected boot mode is stored.

11. The data processing system of claim 8 further comprising a non-volatile memory for storing the boot mode menu.

12. The data processing system of claim 8 further comprising a firmware module, and wherein the selected boot mode is store and retrieved using the firmware module.

13. The data processing system of claim 12 wherein the selected boot mode is stored in non-volatile memory accessible only by the firmware module.

14. The data processing system of claim 12 wherein the firmware module performs BIOS functions.

* * * * *

UNITED STATES PATENT AND TRADEMARK OFFICE
CERTIFICATE OF CORRECTION

PATENT NO.    : 6,507,906 B1
DATED         : January 14, 2003
INVENTOR(S)   : Criddle et al.

It is certified that error appears in the above-identified patent and that said Letters Patent is hereby corrected as shown below:

Column 6,
Line 48, after "is", delete "store" and insert -- stored --.

Signed and Sealed this

Fifth Day of August, 2003

JAMES E. ROGAN
*Director of the United States Patent and Trademark Office*